United States Patent [19]

Harada

[11] Patent Number: 5,008,052
[45] Date of Patent: Apr. 16, 1991

[54] MOLD CLAMPING PRESSURE CONTROL METHOD FOR INJECTION COMPRESSION MOLDING AND INJECTION COMPRESSION MOLDING MACHINE

[75] Inventor: Susumu Harada, Numazu, Japan

[73] Assignee: Toshiba Machine Co., Ltd., Tokyo, Japan

[21] Appl. No.: 279,197

[22] Filed: Dec. 2, 1988

[30] Foreign Application Priority Data

Dec. 3, 1987 [JP] Japan .................. 62-304439

[51] Int. Cl.$^5$ ............................................. B29C 45/80
[52] U.S. Cl. ........................... 264/40.5; 264/328.1; 425/149; 425/150; 425/167; 425/590
[58] Field of Search .................... 264/40.1, 40.2, 40.5, 264/22, 328.1, 328.7, 328.11, 2.2; 425/135, 143, 144, 149, 150, 167, 589, 590

[56] References Cited

U.S. PATENT DOCUMENTS 4,364,878 12/1982 Laliberte et al. ............ 264/328.7

FOREIGN PATENT DOCUMENTS 61-205112 9/1986 Japan .................... 264/328.7
61-261018 11/1986 Japan ...................... 425/150
2193681 2/1988 United Kingdom .............. 425/150

Primary Examiner—Jill L. Heitbrink
Attorney, Agent, or Firm—Young & Thompson

[57] ABSTRACT

A mold clamping pressure control method for injection compression molding through adjustment of the oil pressure in the mold clamping cylinder by the mold clamping cylinder control valve, wherein a resin temperature in the mold is detected by a resin temperature sensor, and detected values thereof are converted by a converter into electric signals, which are in turn compared with a series of the preset pressure changeover temperature setting values to output pressure changeover signals whenever the detected values correspond to the preset values. The pressure changeover signal selects any of a series of the preset pressure setting values to output the valve opening-shutting directing signals converted into a certain valve opening-shutting amount, thereby to control the opening-shutting amounts of the mold clamping pressure control valve.

2 Claims, 3 Drawing Sheets

MOLD CLAMPING PRESSURE CONTROL METHOD FOR INJECTION COMPRESSION MOLDING AND INJECTION COMPRESSION MOLDING MACHINE

FIELD OF THE INVENTION

This invention relates to a mold clamping pressure control of injection compression molding and more particularly to an injection compression molding intended for accomplishing molding of quality product and improving accuracy through a sophisticated mold clamping pressure control corresponding to a variation in the resin temperature characteristics by correlating the pressure changeover point when the multi-stage mold clamping pressure changeover takes place in a compression molding operation by the mold clamping after injection of the resin with a slightly opened mold at a resin temperature detected with a temperature sensor mounted on the mold.

BACKGROUND OF THE INVENTION

Injection compression molding engineering is the technique in which the resin is injected into the slightly opened mold followed by a mold clamping operation to accomplish the molding with the following advantages.

Since the cavity may be filled with an injection pressure lower by several fold than the pressure applied ordinarily for the injection molding, it will require less mold clamping pressure.

A sufficient pressure may be applied to the molten material in the cavity so that relatively finer portions of the mold may be filled with a sufficient material to improve the transferability to the mold.

Less residual stress and fluidity orientation may prevent deformation of product to improve accuracy of the shape.

Sufficient molding pressure to the molten material with enhanced effect of swelling may prevent a sink mark of the thicker product. Such engineering is known to be preferred to manufacture the products which require greater thickness and high accuracy in shape, particularly optical parts such as plastic lens and disk, and various kinds of thicker molded products.

In the actual compression molding operation with the specific resin material and the mold of the specific shape, individual mold clamping pressure control conditions vary depending upon the characteristics of resin, shape of the mold, molten resin or the temperature conditions of the equipment and it was impossible to determine generally how much clamping pressure should be applied at what point during the compression molding operation, for which reason in the conventional injection compression molding operation, the setting of the mold clamping pressure control condition corresponding to the individual cases has always relied on experience. In other words, the shrinkage characteristics of the applicable resin, the temperature setting of the mold temperature controller, the cooling effect, the temperature variation characteristics of the cavity section, variation characteristics of the mechanical motion accompanied by the temperature change of the hydraulic fluid and the like were empirically judged by skill to determine the status of variation in the mold clamping pressure during the compression molding operation. For example, by the timer setting a program in which the mold clamping pressure is varied with time is provided.

According to the conventional injection compression molding operation which sets the compression molding condition for individual cases as a program, it was in fact impossible to cope with the variation in external environment including variation in operational environment particularly, variation in an outdoor temperature, drying extent of the resin and the like in addition to the problems involved in the program per se. When the mold clamping pressure control takes place under the preset program which progresses separately irrespective of the variation in phase of the resin having been filled in the cavity and being in transition from the molten condition to solidification, nonconformity occurs between the variation in phase of the resin and the program due to various factors, so that the resin is occasionally subjected not to fixed pressure intended to be applied under a certain condition but rather to the pressure appropriate for another condition. Accordingly, when the pressure rises during solidifying of the resin from the molten condition, the residual stress generates in the molded product a problem of strength and also problems of internal strain in the optical parts resulting in variation of the light refractive index.

The conventional mold clamping pressure control for the injection compression molding operation requires a certain skill for setting of the control condition per se and gives rise to problem that may not be coped with in individual cases such as for the program which progresses by variation in an external environment and the like even when the necessary conditions have been provided. The aforementioned advantages of the conventional molding technique expected for the injection compression molding operation have not met with effective utilization but with generation of defective molded product as the case may be, for which reason realization of incorporating the characteristics of resin per se fully into the mold clamping pressure control which is not affected by operational conditions, external environments and the like has been intensively desired.

SUMMARY OF THE INVENTION

This invention is intended to secure a mold clamping pressure control which always provides a proper mold clamping pressure no matter how the resin temperature in the cavity varies during the injection compression molding operation and also always provide a fixed mold clamping pressure at the fixed resin temperature.

According to the invention, there is provided a mold clamping pressure control method for injection compression molding through the adjustments of the oil pressure in the mold clamping cylinder by means of the mold clamping cylinder control valve, characterized in that a resin temperature in the mold is detected by a resin temperature sensor, detected values thereof are converted by a converter into electric signals, which are in turn compared with a series of the preset pressure changeover temperature setting values to output pressure changeover signals whenever said detected values correspond to said setting values, said pressure changeover signal corresponding to any of a series of the preset pressure setting values to output valve opening-shutting directing signals converted into a certain valve opening-shutting amount, thereby to control the opening-shutting amounts of said mold clamping pressure control valve.

When the resin temperature is detected by the resin temperature sensor in which an ultrasonic wave is used, the resin temperature may accurately be detected without coming in direct contact with the resin in the cavity, which should be ideal.

According to the invention, there is provided an injection compression molding machine comprising a mold clamping pressure control mechanism, characterized by comprising a mold clamping pressure control valve for adjusting the oil pressure in the clamping cylinder to control the mold clamping pressure of the said injection molding machine, a resin temperature sensor for detecting the resin temperature, a converter for converting the detected resin temperature values into electric signals, a pressure changeover temperature setting device for setting a series of the pressure changeover temperature setting values corresponding each to one of a series of the electric signals, a comparative computation section for comparatively computing the detected resin temperature values converted into the electrical signals and said series of the pressure changeover temperature setting values to output a pressure changeover signal whenever both values are conformed to each other, a pressure setting device for setting a series of the pressure setting values one corresponding to each electric signal and a mold clamping pressure control station for inputting said pressure changeover signals each of which corresponds to one of said series of the pressure setting values and for converting the corresponding pressure setting values into the appropriate valve opening-shutting amount to output the electrical signal directing said mold clamping pressure control valve.

The progressive degree of variation in phase of resin being in transition from the molten condition to solidification is reflected by the resin temperature at that time. In other words, once the resin temperature during variation in phase is detected, the status of the resin at that time could be determined. The strength of appropriate mold clamping pressure applied during progressive of variation in phase relies essentially on the molten-solid condition of the resin and an error made in this setting results in defective molding. Nevertheless, the variation in condition of the resin from the molten condition to solidification will always occur predeterminably and the physical property constant of the resin halfway through the variation in condition may be measured through experiments on all resins available. An assumption of providing a proper value of the mold clamping pressure for a certain resin under a certain condition using such measured values, therefore, may be available. In other words, the resin temperature at a certain point during variation in condition and the magnitude of the mold clamping pressure to be applied at that point are substantially correlated.

The temperature interval beginning from the vicinity of the resin filling temperature to the temperature lower than the resin solidifying temperature is divided into many temperature intervals, and the mold clamping pressure most suited for such temperature interval is provided for each interval. When the number of divisions is increased, it gradually comes close to continuous control and comes close to an ideal condition, notwithstanding the number of division in practice ought to be determined, taking the essential effect into consideration. When the value of the mold clamping pressure is changed over from the pressure value corresponding to the temperature interval prior to transition into the pressure value corresponding to the temperature interval after transition the momentary resin temperature detected by the temperature sensor has transmitted from the range of a certain temperature interval to the range of the next temperature interval, there is provided the mold clamping pressure most suited for the molten-solidifying condition of resin reflected by the resin temperature.

In the course of solidification, the resin temperature gradually goes down and when setting a series of pressure changeover values beforehand beginning from the vicinity of the resin filling temperature to the temperature lower than the resin solidifying temperature and, on the other hand, setting a proper mold clamping pressure in each temperature interval as a series of pressure setting values and making such configuration that, whenever the resin temperature detected by the temperature sensor is conformed with a series of the pressure changeover temperature setting values while gradually changing and that it changes over a series of pressure setting values one after another, unlike the conventional mold clamping pressure control which may not provide any mold clamping pressure anticipated to vary away from the predetermined condition of the resin temperature, it allows to control the compatibility of a certain resin temperature and the value of the mold clamping pressure at that temperature constantly no matter how the resin temperature varies throughout the compression molding.

While further detailed description is given below relating to the example of embodied configuration of this invention by referring to the attached drawings, this invention is not confined to the example of embodiments described.

PREFERRED EMBODIMENTS OF THE INVENTION

Figure 1:
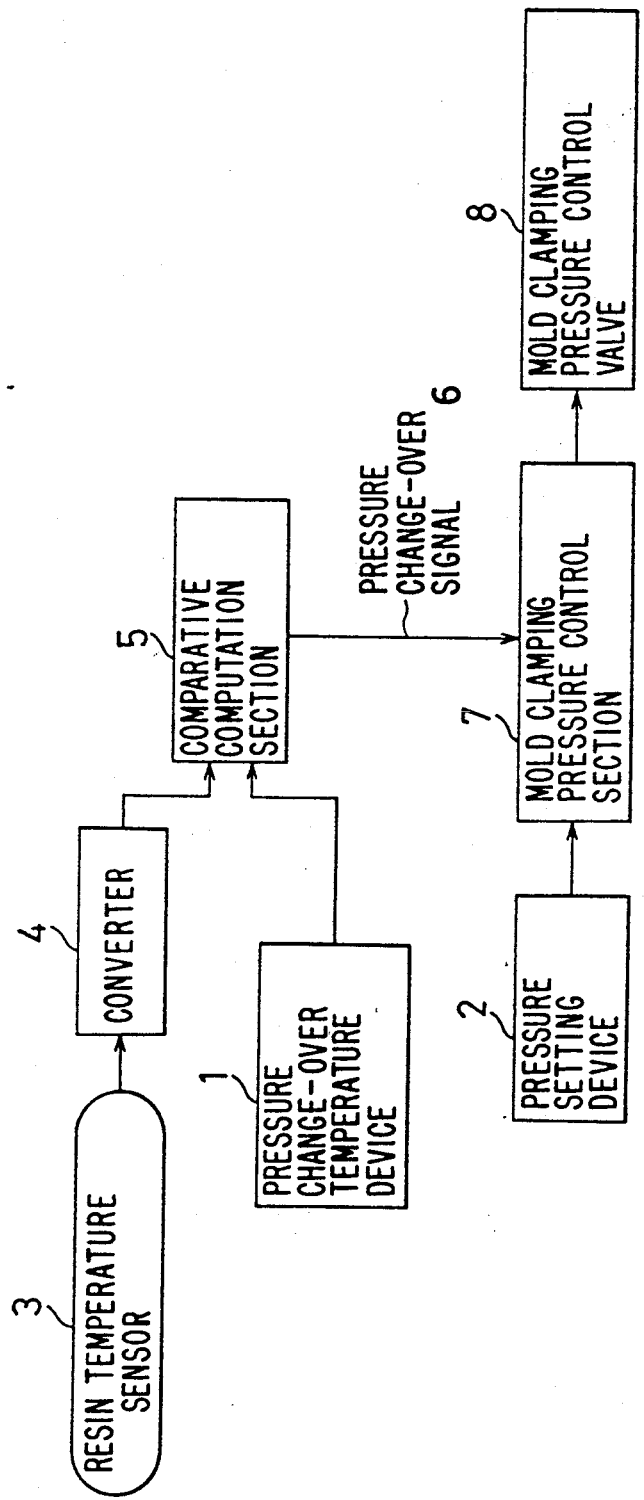
FIG. 1 is a block diagram of the mold clamping pressure control system of the injection compression molding machine according to the invention.
Figure 2:
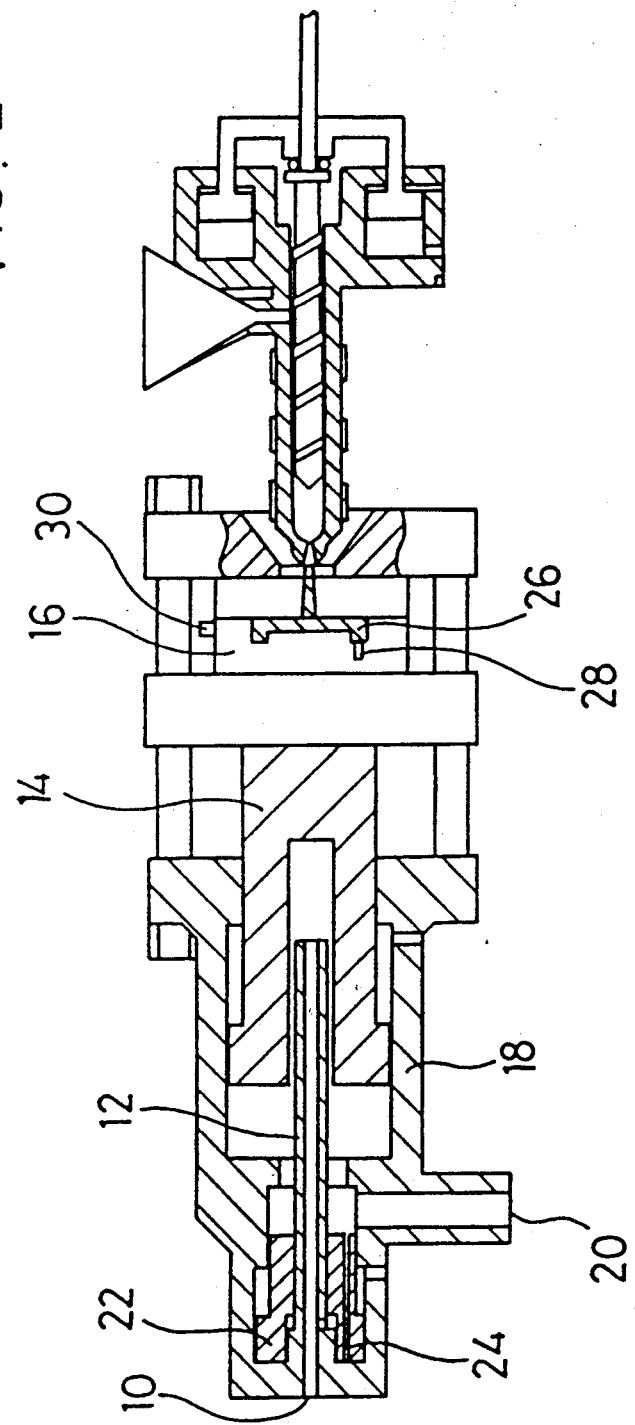
FIG. 2 is a sectional view of the injection compression molding machine equipped with the mold clamping pressure control system according to the invention.

Prior to running the injection compression molding, a series of pressure changeover temperature setting values, for instance, $T_1$, $T_2$, $T_3$, $T_4$, $T_5$, and $T_6$ are set by a pressure changeover temperature setting device 1 as shown in FIG. 1, and a series of pressure setting values, for instance, $P_0$, $P_1$, $P_2$, $P_3$, $P_4$, $P_5$, and $P_6$ are set by a pressure setting device 2. When a high pressure oil is fed from a port 10 to a booster ram 12 shown in FIG. 2, a mold clamping ram 14 moves forward at a high speed and operates mold closing of a mold 16. Since the gap between the booster ram 12 and the mold clamping ram 14 is not completely sealed, it allows a part of the oil to flow into an inside 18 of the mold clamping cylinder. As the advancing speed of the mold clamping ram 14 is sufficiently high, it causes a negative pressure state in a mold clamping cylinder 18 to suck oil from an oil tank and the mold clamping cylinder is filled with the oil. A prefill valve 22 moves forward by the actions of the increased pressure when the high pressure oil is fed to the booster ram 12 and of the negative pressure in the mold clamping cylinder 18, and the port 20 is closed at the position where the prefill valve 22 stops and shuts off the oil in port 20 and the oil in the mold clamping cylinder 18. At the position where the prefill valve 22 stops after moving forward, the oil in the port 10 and the oil in the mold clamping cylinder 18 pass convergently through a through hole 24 arranged in the prefill valve 22. The mold clamping pressure is controlled by the mold clamping pressure control valve connected through the port 10 (not illustrated in FIG. 2).

Figure 3:
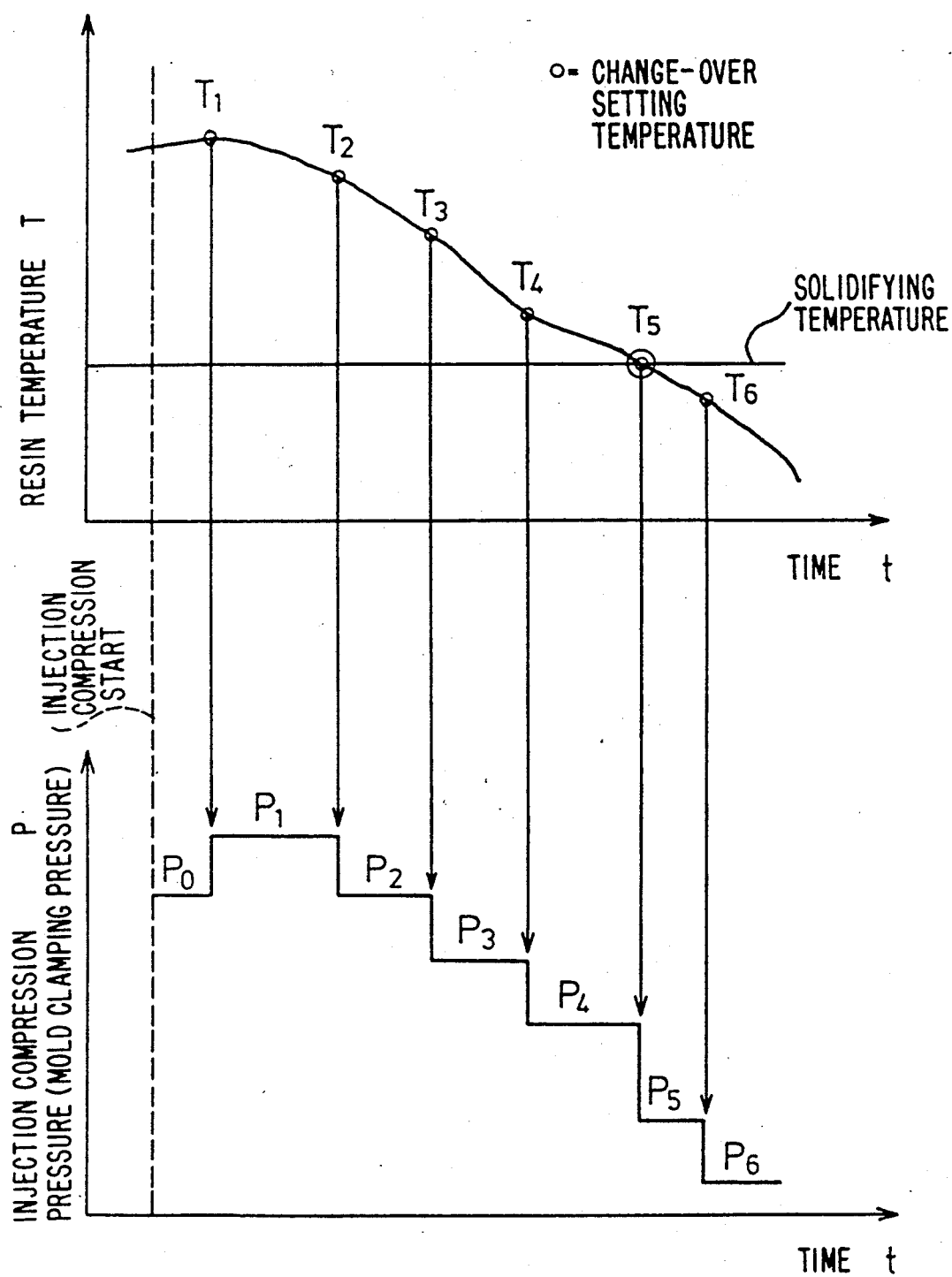
FIG. 3 is a descriptive drawing of action of the mold clamping pressure control system according to the invention.

After a molten resin is injected into a cavity 26 which is filled with the molten resin, the compression molding is carried out. The mold clamping pressure control valve is controlled and an initial mold clamping pressure is regarded as $P_0$ (FIG. 3). A resin temperature sensor 28 of a general type such as the temperature sensor illustrated in FIG. 2 which uses a thermocouple or an infrared sensing type temperature sensor is so installed in the mold that it comes in direct contact with the resin. A general type temperature sensor proves more effective when it is installed on the part of resin which is as thick as possible. In case it is not desired to leave any trace of the sensor on the appearance of the molded product, an ultrasonic wave applied temperature sensor 30 is so installed that it does not come in direct contact with the resin. The ultrasonic wave applied temperature sensor 30 may directly measure the resin temperature from the external side of mold.

As illustrated in FIG. 1, whenever using the converter 4, an electric signal obtained by converting the resin temperature detected by the resin temperature sensor 3 conforms to one of a series of electric signals corresponding respectively to a series of the preset pressure changeover setting values ($T_1$, $T_2$, $T_3$, $T_4$, $T_5$, and $T_6$) as a result of comparative computation, the comparative computation section 5 provides an output of the pressure changeover signal 6. Whenever input of the pressure changeover signal is provided, the mold clamping pressure control section 7 provides an output of a series of electric signals one by one sequentially which directs a make and break amount of the valve corresponding respectively to a series of the preset pressure setting values ($P_1$, $P_2$, $P_3$, $P_4$, $P_5$, and $P_6$) to vary the make and break amount of the mold clamping pressure control valve 8, whereby the mold clamping pressure is varied. As illustrated in FIG. 3, when the resin temperature goes down, the mold clamping pressure varies stepwise at a boundary of the preset pressure changeover temperature, and the pressure is increased in the place where the resin temperature is sufficiently high and the pressure is decreased as the resin temperature comes closer to the solidifying temperature, and when the resin temperature is below the solidifying temperature, little or no pressure need may be applied.

The mold clamping pressure changeover point is set as the preset temperature during the injection compression molding process and as a result of the running pressure control over the mold clamping pressure is varied in multi-stage, since the propagation of pressure is good under the conditions of the higher resin temperature in the mold cavity and the higher fluidity of resin, the effect of injection compression pressure is improved to decrease the factors concerning the defective molding including sink marks and the like and the inner deformation in the molded products may be prevented to decrease the mold clamping pressure at the time when the pressure is not propagated when the resin temperature goes down and the resin is solidified. Particularly, in case the injection compression molding is carried out to produce engineering molded products, which may be defective as the permeability of light varies resulting from the inner deformation in the product, an occurrence of the defective products may be completely prevented if the mold clamping pressure control system according to the present invention is used.

What is claimed is:

1. A mold clamping pressure control method for injection compression molding of resin through adjustments of oil pressure in a mold clamping cylinder by means of a mold clamping pressure control valve, comprising:

detecting a resin temperature in a cavity in a mold by a resin temperature sensor;

converting detected values thereof into electric signals by a converter;

comparing in turn said electric signals with a series of preset pressure changeover temperature setting values to output one pressure changeover signal whenever said detected values correspond to said setting values; and converting said pressure changeover signal corresponding to any of a series of pressure setting values which are predetermined according to the resin temperatures, into a valve opening-shutting amount before outputting valve opening-shutting directing signals, thereby controlling an opening-shutting amount of said mold clamping pressure control valve, whereby a plurality of different mold clamping pressures are successively applied in response to the detection of a plurality of successively different resin temperatures.

2. An injection compression molding machine for resin, with a mold clamping pressure control mechanism, comprising:

a mold clamping pressure control valve for adjusting oil pressure in a mold clamping cylinder to control a mold clamping pressure of said injection molding machine;

a resin temperature sensor for detecting resin temperatures in a cavity in a mold of said machine;

a converter for converting detected resin temperature values into electric signals;

a pressure changeover temperature setting device for setting a series of pressure changeover temperature setting values each corresponding to one of a series of electric signals;

a comparative computation section for comparatively computing the detected resin temperature values converted into the electric signals and said series of the pressure changeover temperature setting values and for outputting a pressure changeover signal each time both values conform to each other;

a mold clamping pressure setting device for setting a series of mold clamping pressure setting values which are predetermined according to the resin temperature, each corresponding to one of a series of electric signals; and a mold clamping pressure control station for inputting said pressure changeover signals each of which corresponds to one of said series of the mold clamping pressure setting values and for converting the corresponding mold clamping pressure setting values into a valve opening-shutting amount to output an electrical signal directing said mold clamping pressure control valve, whereby a plurality of different mold clamping pressures are successively applied in response to the detection of a plurality of successively different resin temperatures.

* * * * *